Oct. 22, 1968  S. M. FREY  3,406,433
SEAT BELT COUPLING DEVICE
Filed Jan. 5, 1967
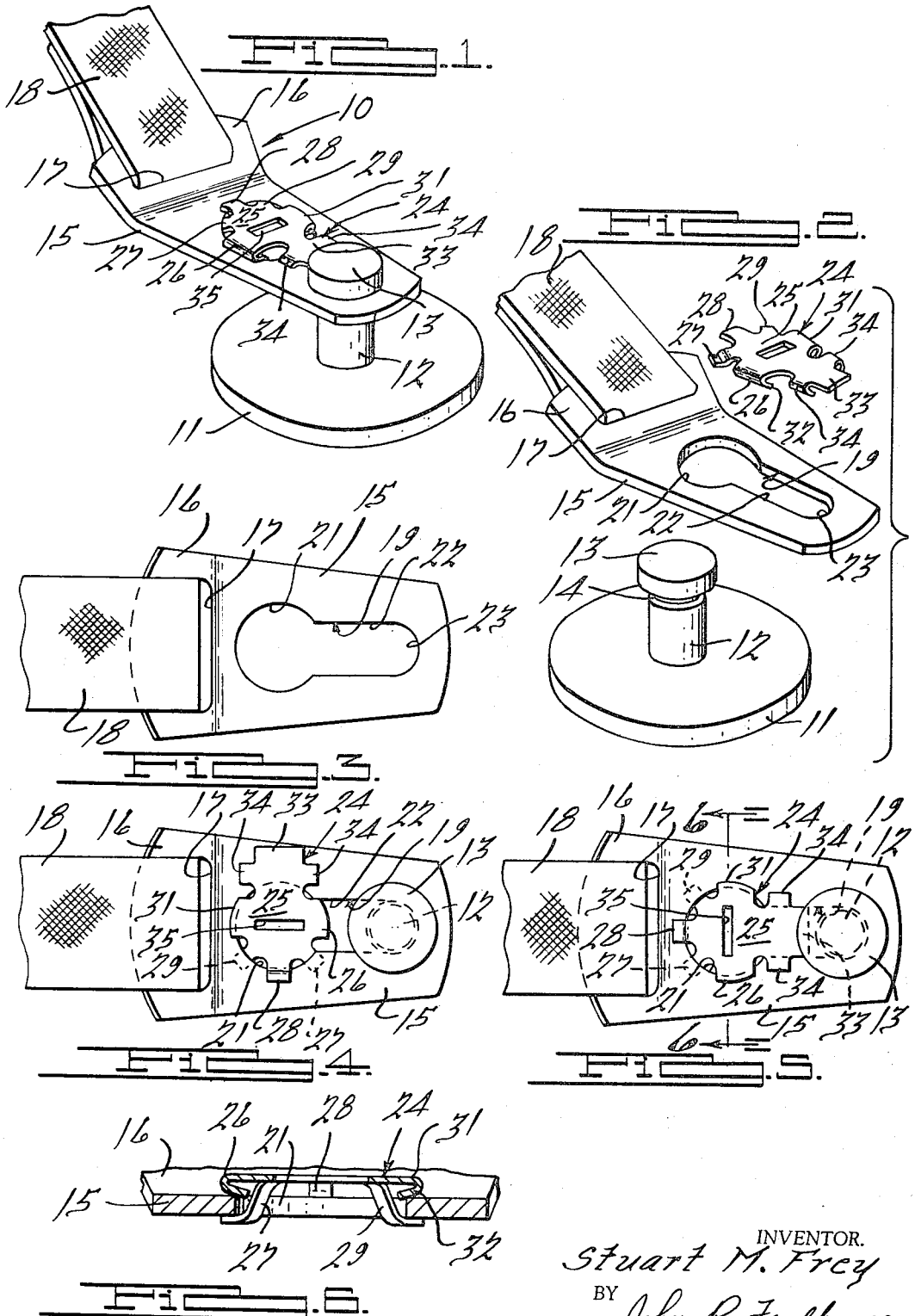
INVENTOR.
Stuart M. Frey
BY John R. Faulkner
John J. Roethel
ATTORNEYS.

United States Patent Office 3,406,433
Patented Oct. 22, 1968

3,406,433
SEAT BELT COUPLING DEVICE
Stuart M. Frey, Birmingham, Mich., assignor to Ford Motor Company, Dearborn, Mich., a corporation of Delaware
Filed Jan. 5, 1967, Ser. No. 607,555
1 Claim. (Cl. 24—223)

ABSTRACT OF THE DISCLOSURE

A quick acting and positive coupling device for attaching a seat belt to a vehicle body member comprising an elongated plate having a keyhole slot which is adapted to receive a headed stud. A retaining clip is insertable and positionable in the keyhole slot to prevent displacement of the plate radially of the stud, the stud head preventing displacement of the plate axially of the stud. The arrangement, however, permits the belt attaching plate to swivel about the stud axis as necessary.

Background of the invention

It is conventional practice to anchor a vehicle seat belt to a vehicle body component by using a threaded eye bolt or threaded stud extending through a plate member to which the end of the seat belt is attached. The threaded eye bolt or stud must be screwed into a threaded plate or a nut welded or otherwise secured to a vehicle body member. From a production line standpoint, the threading operation is time consuming and inefficient. In addition, the threaded element or the member receving the threaded element is subject to inadvertently being stripped of its threads. If this happens, the almost completed vehicle body must be shunted to one side until the damaged parts are changed.

The present invention proposes the elimination of threaded eye bolts, studs or the like for anchoring the seat belt to the vehicle body member.

Summary of the invention

The present invention comprises a coupling device for attaching a seat belt to a vehicle body member comprising an anchor plate adapted to be secured to the vehicle body member. The anchor plate carries a headed stud which projects from the anchor plate at substantially a right angle thereto. An elongated plate is adapted to be secured to an end of a seat belt, the elongated plate having a keyhole slot therein. The keyhole slot has an enlarged circular portion through which the stud head is adapted to fit and a reduced portion to receive the body of the stud. After the plate has been positioned so that the body of the stud is at the end of the reduced portion of the slot, a retaining clip is positioned in the enlarged portion of the keyhole slot and then rotated by a tool, such as a screwdriver, into a position in which an extension portion blocks movement of the elongated plate radially relative to the stud. The head of the stud overlies the plate adjacent the sides of the reduced slot portion and prevents axial displacement.

With the coupling device of the present invention there is no necessity for threading an eye bolt or threaded stud into a body mounted member. Assembly time is reduced and the possibility of thread strippage is eliminated.

Brief description of the drawing

FIG. 1 is a perspective view showing the coupling device embodying the present invention in assembled relationship;
FIG. 2 is an exploded view showing the components embodying the present invention;
FIG. 3 is a plan view of the end of the elongated plate to which the seat belt is adapted to be attached;
FIGS. 4 and 5 illustrate the steps involved in assemblying the coupling device; and
FIG. 6 is a sectional view taken along the line 6—6 of FIG. 5.

Description of the preferred embodiment

Referring now in detail to the drawing, there is shown in FIG. 1 the preferred embodiment of a coupling device, generally designated 10, for attaching a seat belt to a vehicle body member. The coupling device 10 comprises an anchor plate 11 adapted to be welded or otherwise securely fastened to a vehicle component such as a floor pan or side sill member (not shown). The anchor plate 11 carries a cylindrical stud 12 having a head 13 greater in diameter than the body of the stud. The stud 12 may be riveted, welded or otherwise securely made integral with the anchor plate 11. The stud 12 may be undercut beneath the head to provide a groove 14, for a purpose to be explained.

In addition to the anchor plate 11 with its stud 12, the coupling device 10 includes an elongated plate 15 having an angularly upturned end portion 16 with a slot 17 therein adapted to receive one end 18 of a seat belt. The manner in which the seat end is attached to the plate is not critical with respect to the present invention.

The main body portion of the elongated plate 15 has an aperture 19 in the form of a keyhole slot. The keyhole slot comprises an enlarged substantially circular aperture 21 located near the center of the elongated plate 15 and a reduced elongated portion 22 extending toward the end of the elongated plate opposite to that to which the belt is attached. The extreme end 23 of the reduced portion of the slot 19 has a diameter slightly greater than the base diameter of the groove 14 in the stud 12. The diameter of the enlarged aperture portion 21 of the keyhole slot is slightly larger than the diameter of the stud head 13 so that the latter may pass freely therethrough.

The elongated plate 15 is coupled to the anchor plate and its stud 12 by dropping the elongated plate down over the head 13 of the stud, the head projecting through the aperture 21 of the keyhole slot 19. It is then necessary to move the elongated plate radially of the stud 12 so that the reduced portion 22 is seated in the groove 14. The marginal edges of the head 13 will then overlie part of the elongated plate 15 preventing the latter from being lifted from the stud 12.

It is readily apparent, however, that an additional means must be provided to prevent movement of the elongated plate 15 relative to the stud 12 to a position in which the plate could come off the stud 12. This is accomplished by providing a retaining clip, generally designated 24.

The retaining clip 24 is formed or stamped from sheet metal having spring steel or resilient characteristics. It has a substantially circular end portion 25 having a plurality of fingers 26, 27, 28, 29 and 31 therearound.

The fingers 26 and 31 are slightly larger than the other fingers and, as seen in FIG. 6, have a reverse bend 32 which is adapted to rest on the upper edge of the surface of the aperture 21. The fingers 27 and 29 are formed to pass under the edge portions of the aperture 21 and the smaller middle finger 28 is shaped, as were the fingers 26 and 31, to rest on the upper edge of the plate aperture 21.

The retaining clip 24 has an extension portion 33 extending radially from the circular end portion 25. The end portion 33 is provided with a pair of tabs 34 located on opposite sides thereof which have a reverse bend similar to that of the fingers 26 and 31 (see FIG. 2). The retaining clip is provided with a centrally located slot 35 which is rectangularly shaped to receive the end of a screwdriver.

Referring now to FIGS. 4 and 5, the method of installation of the coupling device is illustrated. As shown in FIG. 4, the elongated plate 12 has been dropped down over the stud head 13 and then moved radially so that the elongated narrow portion 22 of keyhole slot 19 is located under the head and is seated in the groove 14. Next, the retaining clip 24 is positioned in the circular aperture 21 of the keyhole slot 19, it being only necessary to ensure that the fingers 27 and 29 are hooked under the elongated plate while the fingers 28 and 31 rest on top of the plate. A screwdriver is then inserted in the slot 35 and the latter is rotated ninety degrees in a clockwise direction. It may be necessary to press slightly on the end portion 33 to ensure that the latter will pass under the head 13 on the stud. Rotation of the slip is continued until the FIG. 5 position is reached at which time the tabs 34 will engage the edge walls of the elongated portion 22 of the keyhole slot thus acting as a centering device. With the components in the position shown in FIG. 5 (also see FIG. 1), the coupling device then positively couples the belt to the vehicle body. The head 13 on the stud prevents axial displacement of the elongated plate 15 relative to the stud 12 and the retaining clip prevents radial displacement of the elongated plate 15 relative to the plate 12 so that the latter cannot move to a position in which it could come off over the head 13 of the stud. Yet the elongated plate 15 and therefore the belt end 18 are free to swivel around the axis of the stud as required during use.

It will be understood that this invention is not to be limited to the exact construction shown and described but that various changes and modifications may be made without departing from the spirit and scope of the invention as defined in the appended claim.

I claim:

1. A coupling device for attaching a seat belt to a vehicle body member comprising:
   an anchor plate adapted to be secured to a vehicle body member,
   a headed stud projecting from said anchor plate at substantially a right angle thereto,
   an elongated plate adapted to be secured to an end of a seat belt,
   said elongated plate having a keyhole slot therein,
   said keyhole slot having an enlarged portion through which the stud head fits and a reduced portion into which the body of said stud is received upon movement of the elongated plate in a first direction radially of said stud,
   and a retaining clip positionable and rotatable in said keyhole slot to block movement of said elongated plate radially relative to said stud in a direction opposite to said first direction,
   said retaining clip having a substantially circular main body portion with a plurality of resilient fingers spaced therearound,
   selected ones of said fingers being adapted to lie on opposite sides of the elongated plate upon some of the fingers being forced through the enlarged portion of said keyhole slot,
   said selected ones of said fingers retaining said clip on said elongated plate,
   said retaining clip also having an extension portion extending radially from the circular main body portion,
   said extension portion being positionable, upon rotation of said clip, beneath the stud head into substantially abutting relation to the body of said stud,
   said retaining clip extension portion having resilient side tabs thereon engageable with the side walls of the reduced portion of said keyhole slot to releasably hold the retaining clip extension portion beneath said stud head,
   the head of said stud retaining said plate against axial displacement relative thereto.

References Cited

UNITED STATES PATENTS 2,302,389   11/1942   Kost _____ 151—41.75

FOREIGN PATENTS 15,386   1894   Great Britain.

BOBBY R. GAY, *Primary Examiner.*

E. SIMONSEN, *Assistant Examiner.*